Sept. 16, 1969  H. SINGER ET AL  3,466,814
PHENOLIC RESIN BONDED ABRASIVE SHEETS
AND PROCESS OF MAKING THE SAME
Filed July 2, 1965 2 Sheets-Sheet 1

Hermann Singer  INVENTORS
Hermann Delius
Johann Kühr

BY Munson H. Lane

ATTORNEY

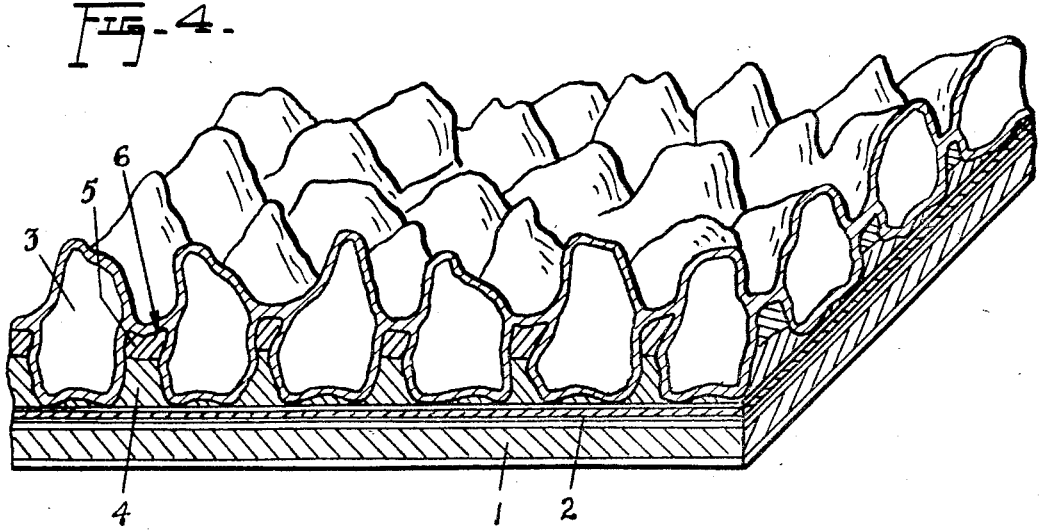
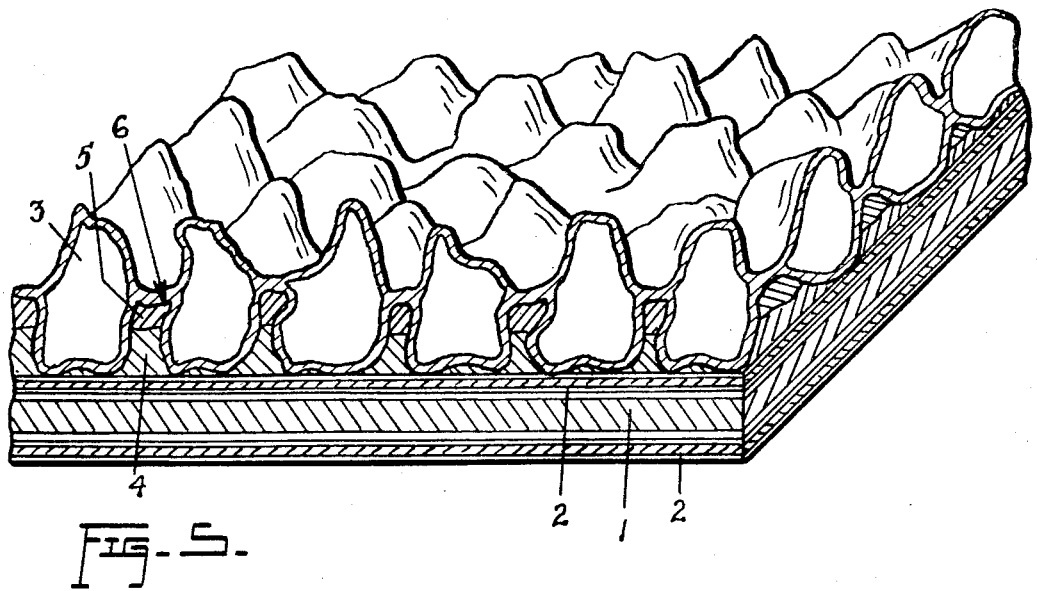

United States Patent Office 3,466,814
Patented Sept. 16, 1969

3,466,814
PHENOLIC RESIN BONDED ABRASIVE SHEETS
AND PROCESS OF MAKING THE SAME
Hermann Singer, Hamburg, Hermann Delius, Ahrensburg, Holstein, and Johann Kühr, Harksheide, near Hamburg, Germany, assignors to Reichhold Chemicals, Inc., White Plains, N.Y.
Filed July 2, 1965, Ser. No. 469,066
Claims priority, application Germany, July 28, 1964,
R 28,861 and R 38,475
Int. Cl. B24d 11/00
U.S. Cl. 51—297                                 9 Claims

ABSTRACT OF THE DISCLOSURE

A phenolic resin bonded abrasive sheet consisting of a pre-sized backing material that received a finishing treatment and a layer of abrasive granules thereon, characterized in that it contains a synthetic resin intermediate layer between the backing fabric and the phenolic resin binder layer made up of a hardened mixture, consisting of:

Figure 1:
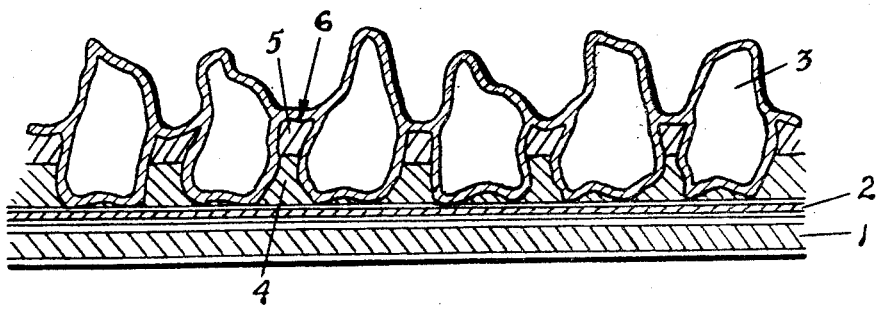

(a) epoxy resins having as a basis unmodified bisphenol A;
(b) at least one epoxy resin having as a basis bisphenol A, which has been internally modified by reaction with castor oil and
(c) curing agent for said intermediate layer, said phenolic resin consisting essentially of a phenol formaldehyde condensation product.

---

The invention relates to phenolic resin bonded abrasive sheets and to the method of making the same.

The flexible support or backing, such as cloth, used in the manufacture of phenolic resin bonded abrasive devices, is given a finishing treatment that varies depending upon the abrading operation to be performed, i.e., whether wet grinding or dry grinding is contemplated.

The finishing treatment of the backing cloth used for making articles of this type, for example, cotton fabrics for dry grinding operations, is carried out by impregnation or coating of these fabrics with sizes made of hide glue, starch (starch derivatives) or dextrin. It is also possible to use together therewith certain proportions of aqueous synthetic resin dispersions for the finishing treatment of the backing material.

In order to prevent the phenolic resin binder which later serves as the bonding medium for the abrasive granules, from further penetrating into the textile backing, it is proposed to provide the surface to which the abrasive granules may be bonded with various coats or layers of impregnating or laminating masses, the purpose of which is to cause adherence of the conventionally processed textile backing to the bonding medium for the abrasive granules.

It is also possible to provide the textile backing, which already has a sizing coat, with the aforesaid impregnating or coating masses by employing a full bath impregnation process. In this case, the effective intermediate layer would, of course, be applied to both sides of the backing.

In the manufacture of abrasive devices there have been used, as well as proposed: simple and modified phenolic resins, particularly aqueous phenol resols; combinations of phenolic resins and polyamides; combinations of phenolic resins and synthetic resin dispersions; combinations of epoxy resins and polyamidoamines; mixtures of epoxy resins, having as a basis bisphenols, and diglycide ethers of polyglycols in combination with the usual hardening agents.

The use heretofore of these known intermediate layers has met with little or no success. The disadvantages are: in the case of phenolic resins or phenolic resin-polyamide combinations and combinations of phenolic resins and synthetic resin dispersions, the danger of embrittlement of the textile backing. The adherence effect achieved with larger sized abrasive materials is not sufficient, and the tearing strength of the fabric is greatly impaired.

When combinations of epoxy resins and polyamidoamines are used this is at a sacrifice of thermal stability. Due to the nature of this layer, the further or renewed wettability with an aqueous phenolic resin binder, especially when a thin film or coating is desired, becomes extremely difficult.

Even in the case of using only small proportions of polydioldiglycidylethers in the mixture with epoxy resins, having as a basis bisphenols, in combination with the conventional curing agents, the resulting layers are not entirely satisfactory in all cases from the standpoint of heat stability, adherence promotion, mechanical properties and moisture resistance, particularly when the abrasive particles used are in the range of large sized grains.

It is therefore an object of the present invention to provide phenolic resin bonded abrasive products comprising a cloth backing having a sizing coat, i.e., which has been treated for example with hide glue, starch or dextrin, if necessary, together with fillers, and an abrasive granule layer 3 bonded thereon which is characterized in that the latter contains an intermediate layer 2 of a synthetic resin between the cloth backing 1 and the phenolic resin binder 4 consisting of hardened mixtures composed of (a) epoxy resin having as a basis bisphenol A
(b) epoxy resin having as a basis bisphenol A which has been internally plasticized by reaction with castor oil and
(c) curing agents The abrasive sheets of the present invention are superior in many respects, particularly from the standpoint of their grinding action, also in the large particle size range, to those obtained by prior art methods. The technical advance offered by the product of the present invention is probably due to the fact that the composition of the novel synthetic resin intermediate layer is capable of promoting a high degree of adherence between the cloth backing and the phenolic resin binder. There is no impairment of the resistance and flexibility of the cloth backing. The following primary advantages, among others, distinguish the novel abrasive product from the previously used and proposed intermediate layer systems:

Although the use of the specific type of synthetic resin intermediate layer does produce a distinct plasticization of the intermediate layer, this will not impair the thermal stability and the mechanical resistance of the layer system as a whole and, therefore, there is no premature or excessive rate of consumption of the abrasive article even as a result of maximum grinding rates.

As epoxy resins having as a basis bisphenol A, it is possible to use: liquid and solid epoxy resins with terminal epoxy groups, that are prepared by the reaction of bisphenol A with epichlorohydrin or dichlorohydrin in an alkaline medium.

The epoxy equivalent weights of these epoxy resins based upon bisphenol A lie between 180 and 500; the viscosities of the liquid resins were found to be between 10,000 and 60,000 cps. at 25° C. As solid resins it is recommended to use those having a melting point up to 75° C. according to Durran, since these are most suitable. Also suitable are mixtures of epoxy resins based upon bisphenol A in the form of liquid resins and so-called reactive diluents with monoepoxide linkages, as for example butylglycidyl ether
phenylglycidyl ether
cresylglycidyl ether
styrene oxide The viscosities of these mixtures lie between 400 and 5,000 cps.

With regard to the epoxy resins having bisphenol A as a basis which have been internally plasticized with castor oil, this is understood to include resins that are prepared by the reaction of bisphenol A-diglycidyl ether with castor oil in a mole ratio of 1:0.25 to 1:0.3, as for example Epotuf® IP.

This reaction is carried out in the presence of Lewis-acids such as tin tetrachloride, boron trifluoride and the addition products thereof, for example, to acetic acid, ethylether, phenol, cresol, and piperidine. The reaction products of epoxy resins and castor oil still contain epoxy groups so that they can be hardened with the usual curing agents.

Epoxy resins having bisphenol A as a basis, that have been found particularly suited for use in the present invention are:

Epotuf® 37–140, Epikote® 828, unmodified liquid resins having an epoxy equivalent between 170 and 280

As the epoxy resins having bisphenol A as a basis and which have been internally plasticized with castor oil, it is preferred to use:

Reaction products of liquid epoxy resins, having an epoxy equivalent between 170 and 280, with castor oil. The reaction products in this case have epoxy equivalents between 450 and 700 and viscosities between 40,000 and 100,000 cps.

Suitable mixture ratios for the types of resins as defined in the appended claims under (a) and (b) lie between:

| 10 parts by weight of epoxy resin having bisphenol A as a basis. | and | 90 parts by weight of epoxy resin having bisphenol A as a basis, which has been internally plasticized by reaction with castor oil. |
|---|---|---|
| Up to 90 parts by weight of epoxy resin having bisphenol A as a basis. | and | 10 parts by weight of epoxy resin having bisphenol A as a basis, which has been internally plasticized by reaction with castor oil. |

Preferred mixture ratios lie between the limits of:

| 80 parts by weight of epoxy resin having bisphenol A as a basis. | and | 20 parts by weight of epoxy resin having bisphenol A as a basis, which has been internally plasticized by reaction with castor oil. |
|---|---|---|
| Up to 95 parts by weight of epoxy resin having bisphenol A as a basis. | and | 5 parts by weight of epoxy resin having bisphenol A as a basis, which has been internally plasticized by reaction with castor oil. |

Liquid resins can be used either in the form of solvent-free mixtures or in the form of solutions.

Solid resins, on the other hand, are always applied in the form of a solution.

In general, it is possible to use as curing agents for the synthetic resin intermediate layer of the present invention, all the substances that have been used successfully for hardening epoxy resins, as for example aliphatic polyamines, aromatic polyamines, acid anhydrides.

Particularly suitable are aromatic polyamines, such as metaphenylenediamine, methylenedianiline, diaminodiphenylsulfone. The use of these substances makes it possible to obtain in the usual way, by impregnation or coating followed by drying, an intermediate layer which, at first, is still physically dry and non-sticky and considered from a chemical standpoint it has not yet hardened. This permits a subsequent reaction with the phenolic resin binder that is applied later whereby a high degree of adherence is obtained between the binder and the backing cloth.

The synthetic resin intermediate layer according to the present invention is applied to a suitable support or backing material. It is preferred to use backing materials recommended for dry grinding such as suitable cotton and/or staple fiber fabrics.

Examples of the new type synthetic resin intermediate layer provided in accordance with the present invention are:

Example 1

170 parts by weight of epoxy resin having as a basis bisphenol A (the commercial products being named Epotuf® 37–140, Epikote® 828)

30 parts by weight epoxy resin having as a basis bisphenol A which has been internally plasticized by reaction with castor oil (the trade name of the produce being Epotuf® IP)

27.5 parts by weight methaphenylenediamine are thoroughly mixed and then applied as an intermediate layer on the backing material.

Example 2

190 parts by weight of epoxy resin having as a basis bisphenol A (the trade names being Epotuf® 37–40, Epikote® IP 828)

10 parts by weight of epoxy resin having as a basis bisphenol A, which has been internally plasticized by reaction with castor oil (trade name Epotuf® IP)

54 parts by weight of 4,4-diaminodiphenylmethane
20 parts by weight of solvent (xylene/methylisobutylketone 80:20)
viscosity (Gardner): W–X are thoroughly mixed and then applied as an intermediate layer on the backing material.

Example 3

180 parts by weight of epoxy resin having as a basis bisphenol A (trade names Epotuf® 37–140, Epikote® 828)

20 parts by weight of epoxy resin having as a basis bisphenol A, which has been internally plasticized by reaction with castor oil (trade name Epotuf® IP)

67 parts by weight of diaminodiphenylsulfone
28 parts by weight of solvent (xylene/methylisobutylketone 80:20)
viscosity (Gardner): W–X are thoroughly mixed and then applied as an intermediate on the backing material.

The following are examples of the preparation of phenolic resin bonded abrasive products containing the synthetic resin intermediate layer according to the present invention.

The fabric used as starting material is a crude abrasive cloth that was subjected to a finishing treatment. The weight of the crude fabric is 270 g./m.$^2$. The side of the fabric that faces the layer of abrasive granules is covered with the intermediate layer of the present invention, in accordance with Examples 1 to 3 in an amount corresponding to 20 g. of solids pe square meter.

It is possible to apply the active intermediate layer by impregnation in a full bath of the abrasive cloth which already has a sizing coat. When a solvent-containing interlayer mass is used, the drying can be effected at room temperature or at a slightly raised temperature. After this, there is applied a liquid phenol-formaldehyde condensation product having a viscosity of 8,000 to 10,000 cps. at 20° C. and a B-time (hardening time needed) for the phenolic resin to pass to the so-called B-stage) at 120° C. of about 12 minutes, in an amount of 120 g./m.$^2$. Normal corundum having No. 50 grain size is scattered over the layer of phenolic resin binder, which at this point is still moist.

The preliminary hardening of the base binder material is now advanced to a point beyond the B-stage, at which the abrasive grains are firmly anchored to the carrier surface and, upon applying the binder material that serves as a cover, it is no longer possible to dislodge them from the base binder or to modify their position therein.

As the binder material that serves as a cover, it is possible to use a liquid phenol-formaldehyde condensation product having a viscosity of 1,000 cps. at 20° C. in its unmodified form. Instead of this base binder, it is also recommended to use a mixture consisting of 60 parts liquid phenol-formaldehyde condensation product and 40 parts inorganic fillers.

This binder material is applied in a quantity of 250 to 300 g./m.² with the aid of roller-type applicator. The hardening is completed within a period of 6 hours at an optimum, empirically determined, temperature pattern curve.

Immediately following the hardening procedure, it is recommended to treat the abrasive grains, which were exposed to drying out temperatures during the hardening procedure, with moist steam and thus restore their hygroscopic equilibrium under normal climatic conditions.

The abrasive sheets which have been provided with a synthetic resin intermediate layer in accordance with Examples 1 to 3, are distinguished from abrasive sheets that were prepared with conventional interlayers by important advantages which are previously mentioned in the present description.

The novel feature provided by this invention is illustrated in the accompanying drawings.

FIG. 1 shows the make-up of the phenolic resin bonded abrasive sheets of the present invention including the layer of abrasive granules 3, wherein 1 represents the backing for the granules consisting of a pre-sized cotton fabric.

The binder 6 for the abrasive granules, which consists of the phenolic resin base binder 4 and the phenolic resin cover binder 5, is clearly shown in the drawing. The intermediate synthetic resin layer of the present invention is identified by the numeral 2. As the abrasive granules it is possible to use corundum, silicon carbide or other abrasive materials belonging to various classes from the standpoint of quality and grain sizes which are customary in the abrasive paper and the like industry.

Figure 2:
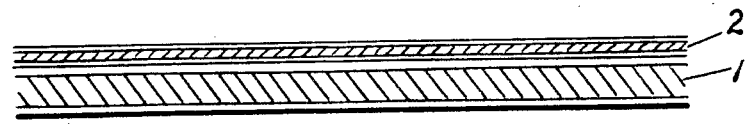

FIG. 2 shows the support for the abrasive granules on a pre-sized cotton fabric 1 and the intermediate layer having the synthetic resin composition according to the present invention.

As the abrasive granule backing it is recommended to use a fabric having a crude weight of 270 g. per square meter.

Figure 3:
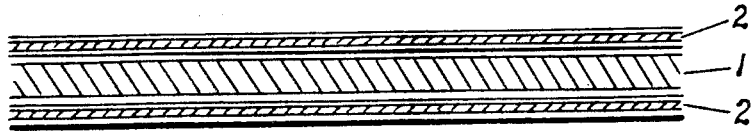

FIG. 3 shows the abrasive granule backing consisting of a pre-sized cotton fabric 1 with the upper synthetic resin intermediate layer 2 and the lower impregnated layer 2 of the same material which is formed in the course of the full-bath impregnation step. The lower layer 2, in this case, does not have to fulfill the function that is the object of the present invention. The lower layer 2 merely contributes, in a very advantageous manner, to further stiffening and increasing the ruggedness of the abrasive granule backing.

FIG. 4 again illustrates the abrasive sheet according to the present invention.

FIG. 5 shows the abrasive sheet according to the present invention prepared with a backing according to FIG. 3.

We claim:
1. A laminate comprising
  (1) a size impregnated layer of fabric material,
  (2) an abrasive layer comprising a phenol formaldehyde resin binder having abrasive granules imbedded therein, and
  (3) a hardenable synthetic resin intermediate layer consisting essentially of
    (a) at least one epoxy resin prepared by reaction of bisphenol A with a member of a group consisting of epichlorohydrin and dichlorohydrin,
    (b) at least one epoxy resin prepared by reaction of bisphenol A-diglycidyl ether with castor oil, and
    (c) a curing agent for said intermediate layer.
2. A laminate as defined in claim 1 wherein the curing agent (c) for the intermediate layer (3) is an aromatic polyamine.
3. A laminate as defined in claim 1 wherein a synthetic resin containing layer (3) is applied to both sides of the fabric layer (1).
4. A laminate as defined in claim 1 wherein the fabric material of layer (1) is selected from a group consisting of cotton fabrics and staple fiber fabrics.
5. A laminate as defined in claim 1 wherein the intermediate layer (3) is a hardenable mixture of 10 to 90 parts by weight of epoxy resin (a) and 90 to 10 parts by weight of epoxy resin (b).
6. A laminate as defined in claim 1 wherein epoxy resin (b) is obtained by reacting the ether with castor oil in a molar ratio of 1:0.25 to 1:0.3.
7. A laminate as defined in claim 1 wherein the fabric material of layer (1) is sized with a member of a group consisting of hide glue, starch and starch derivatives.
8. A laminate as defined in claim 4 wherein the backing material is cotton fabric.
9. A laminate as defined in claim 4 wherein the backing material is a staple fiber fabric.

References Cited
UNITED STATES PATENTS

| | | | |
|---|---|---|---|
| 2,347,662 | 5/1944 | Carlton et al. | 51—298.1 |
| 2,627,145 | 2/1953 | Frigstad | 51—298 |
| 2,824,851 | 2/1958 | Hall | 51—298 |
| 3,276,852 | 10/1966 | Lemelson | 51—298 |
| 2,981,615 | 4/1961 | Baumgartner et al. | 51—298 |

DONALD J. ARNOLD, Primary Examiner

U.S. Cl. X.R.

51—298